J. POZSONYI.
ROLLING PIN.
APPLICATION FILED MAY 7, 1909.
932,322.  Patented Aug. 24, 1909.
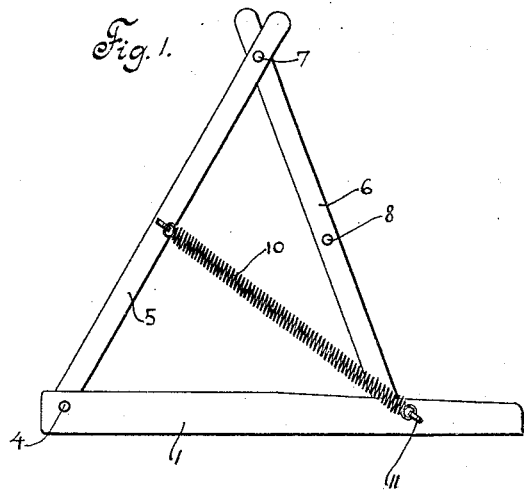
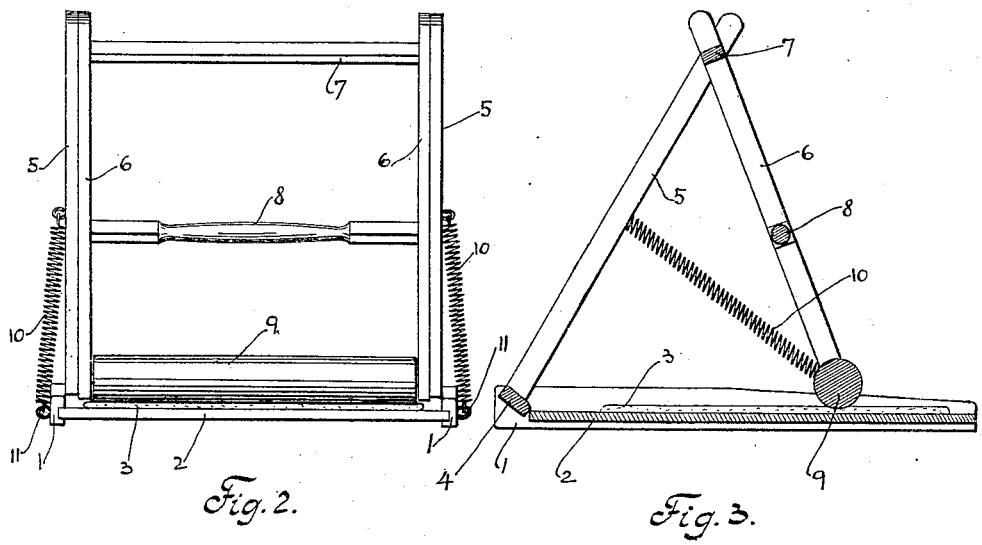
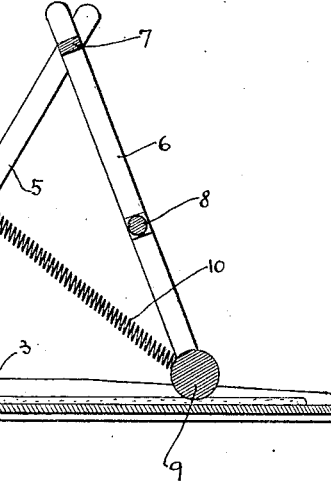
Witnesses
Frank Frimmer
R. H. Butler
Inventor
J. Pozsonyi,
By H. C. Everitt Co.
Attorneys

UNITED STATES PATENT OFFICE.

JOSEF POZSONYI, OF SEWICKLEY, PENNSYLVANIA.

ROLLING-PIN.

932,322.  Specification of Letters Patent.  Patented Aug. 24, 1909.

Application filed May 7, 1909.  Serial No. 494,521.

*To all whom it may concern:*

Be it known that I, JOSEF POZSONYI, a subject of the King of Hungary, residing at Sewickley, in the county of Allegheny and State of Pennsylvania, have invented certain new and useful Improvements in Rolling-Pins, of which the following is a specification, reference being had therein to the accompanying drawing.

This invention relates to rolling pins, and the object of the invention is to provide a novel pin supporting frame for facilitating the operation of rolling or kneading dough, preparatory to making pastry.

I accomplish the above object by providing a kneading board with two pivoted frames, one frame supporting a revoluble rolling pin and handle, while the other frame is connected to the board by retractile springs adapted to normally maintain the rolling pin in operable relation to the kneading board.

The detail construction entering into the invention will be hereinafter described and then specifically claimed, and reference will now be had to the drawing forming part of this application, wherein there is illustrated the preferred embodiments of the invention, but it is to be understood that the structural details thereof can be varied or changed without departing from the spirit or scope of the invention.

In the drawings, Figure 1 is a side elevation of the improved rolling pin, Fig. 2 is a front elevation of the same, and Fig. 3 is a longitudinal sectional view The reference numerals 1 designate parallel rails supporting a kneading board 2 upon which dough 3 is placed.

4 designates a bar trunnioned between the rear ends of the rails 1, said bar having two inclined arms 5, constituting one of the supporting frames of a rolling pin.

Trunnioned between the upper ends of the arms 5 is a rolling pin frame, comprising side arms 6 connected at the upper ends by a transverse bar 7 and intermediate the ends of said arms by a handle 8.

9 designates a rolling pin revolubly mounted between the lower ends of the arms 6, and said rolling pin is adapted to roll upon and flatten the dough 3.

10 designates retractile springs connected to the arms 5 intermediate the ends thereof and to the outer sides of the rails 1, as at 11.

By gripping the handle 8 the frames supporting the rolling pin 9 can be moved to cause the rolling pin to pass back and forth over the dough 3 and considerable pressure can be brought to bear upon the frame 6.

Having now described my invention, what I claim as new, is;—

1. The combination with a rolling pin, of rails, a kneading board supported by said rails, a bar trunnioned between said rails, arms carried by said bar, arms trunnioned between the upper ends of said arms, and adapted to revolubly support said rolling pin, a handle connecting the last mentioned arms, and retractile springs connecting the first mentioned arms with said rails.

2. The combination with a rolling pin, of rails, a kneading board supported by said rails, a bar trunnioned between said rails, arms carried by said bar, arms trunnioned between the upper ends of said arms, and adapted to revolubly support said rolling pin, and retractile springs connecting the first mentioned arms with said rails.

In testimony whereof I affix my signature in the presence of two witnesses.

JOSEF POZSONYI.

Witnesses:
 A. H. RABSAIG,
 NICHOLAS TCÖKOFF.